US009205826B2

(12) United States Patent
Lee et al.

(10) Patent No.: US 9,205,826 B2
(45) Date of Patent: Dec. 8, 2015

(54) WIPER SYSTEM AND CONTROL METHOD THEREOF

(71) Applicant: Hyundai Motor Company, Seoul (KR)

(72) Inventors: Kyung Ro Lee, Chungcheongnam-do (KR); Jae Han Jung, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/137,551

(22) Filed: Dec. 20, 2013

(65) Prior Publication Data

US 2015/0105942 A1 Apr. 16, 2015

(30) Foreign Application Priority Data

Oct. 10, 2013 (KR) .................. 10-2013-0120738

(51) Int. Cl.
*B60R 11/04* (2006.01)
*B60S 1/04* (2006.01)
(Continued)

(52) U.S. Cl.
CPC .............. *B60W 10/06* (2013.01); *B60Q 1/143* (2013.01); *B60R 1/00* (2013.01); *B60R 11/04* (2013.01); *B60S 1/02* (2013.01); *B60S 1/026* (2013.01); *B60S 1/04* (2013.01); *B60S 1/0818* (2013.01); *B60S 1/0833* (2013.01); *B60S 1/0844* (2013.01); *B60W 10/30* (2013.01); *B60W 50/14* (2013.01); *G06F 17/00* (2013.01); *G06T 7/0002* (2013.01); *H04N 5/2254* (2013.01); *B60Q 2300/312* (2013.01); *B60R 2001/1253* (2013.01); *B60R2011/0026* (2013.01); *B60R 2300/00* (2013.01); *B60R 2300/10* (2013.01); *B60R 2300/108* (2013.01); *B60R 2300/30* (2013.01); *B60R 2300/307* (2013.01); *B60W 2050/146* (2013.01); *G06T 2207/30248* (2013.01); *G06T 2207/30252* (2013.01)

(58) Field of Classification Search
CPC ................. H04N 5/2254; B60R 11/04; B60R 2001/1253; B60R 2011/0026; B60R 2300/00; B60R 2300/10; B60R 2300/008; B60R 2300/30; B60R 2300/307; B60R 1/00; B60S 1/02; B60S 1/04; B60S 1/0844; B60S 1/0818; B60S 1/0833; B60Q 1/143; B60Q 2300/312; G06F 17/00; G06T 2207/30248; G06T 7/0002; G06T 2207/30252
USPC .................. 701/2, 36, 45; 382/104; 348/148; 340/937; 455/418–420
See application file for complete search history.

(56) References Cited

U.S. PATENT DOCUMENTS 5,042,439 A * 8/1991 Tholl et al. ................. 123/179.2
5,534,845 A * 7/1996 Issa et al. .................... 340/425.5
(Continued)

FOREIGN PATENT DOCUMENTS

JP 2005-504964 A 2/2005
KR 10-2010-0051905 A 5/2010
(Continued)

*Primary Examiner* — Russell Frejd
(74) *Attorney, Agent, or Firm* — McDermott Will & Emery LLP

(57) ABSTRACT

A wiper system and a control method thereof are provided. The wiper system includes a first camera provided inside a vehicle to photograph outside of the vehicle beyond a windshield glass. A wiper apparatus removes foreign materials from the windshield glass, and a body control module operates the wiper apparatus. The telematics module communicates with a driver terminal and controls the body control module. The telematics module determines whether an external view is extractable from an image acquired by the first camera during an engine stop, and applies a wiper operation signal to the body control module based on the communication result according to a communication with the driver terminal if the external view is not extracted.

14 Claims, 2 Drawing Sheets

(51) Int. Cl.

| | | |
|---|---|---|
| *B60W 10/06* | (2006.01) | |
| *B60W 10/30* | (2006.01) | |
| *B60W 50/14* | (2012.01) | |
| *G06F 17/00* | (2006.01) | |
| *B60S 1/08* | (2006.01) | |
| *B60S 1/02* | (2006.01) | |
| *B60Q 1/14* | (2006.01) | |
| *B60R 1/00* | (2006.01) | |
| *H04N 5/225* | (2006.01) | |
| *G06T 7/00* | (2006.01) | |
| *B60R 1/12* | (2006.01) | |
| *B60R 11/00* | (2006.01) | |

(56) References Cited

U.S. PATENT DOCUMENTS

| | | | |
|---|---|---|---|
| 7,777,993 B2* | 8/2010 | Sakamoto | 361/33 |
| 2003/0001955 A1* | 1/2003 | Holz et al. | 348/148 |
| 2003/0059218 A1* | 3/2003 | Sakata et al. | 396/429 |
| 2006/0157639 A1* | 7/2006 | Shaffer et al. | 250/208.1 |
| 2010/0037072 A1* | 2/2010 | Nejah | 713/310 |
| 2011/0060496 A1* | 3/2011 | Nielsen et al. | 701/33 |
| 2011/0093306 A1* | 4/2011 | Nielsen et al. | 705/7.13 |
| 2011/0273582 A1* | 11/2011 | Gayko et al. | 348/222.1 |
| 2012/0078443 A1* | 3/2012 | Matsubara | 701/2 |
| 2012/0113258 A1* | 5/2012 | Fiess et al. | 348/148 |
| 2012/0208579 A1* | 8/2012 | Persson et al. | 455/507 |
| 2013/0039544 A1* | 2/2013 | Robert et al. | 382/104 |
| 2013/0044910 A1* | 2/2013 | Cord et al. | 382/100 |
| 2013/0046421 A1* | 2/2013 | El Fassi et al. | 701/2 |
| 2013/0103257 A1* | 4/2013 | Almedia et al. | 701/36 |
| 2013/0332004 A1* | 12/2013 | Gompert et al. | 701/1 |

FOREIGN PATENT DOCUMENTS

| | | |
|---|---|---|
| KR | 101043936 B1 | 6/2011 |
| KR | 101144916 | 10/2011 |
| KR | 1020110110652 A | 10/2011 |
| KR | 1020120050159 A | 5/2012 |

* cited by examiner

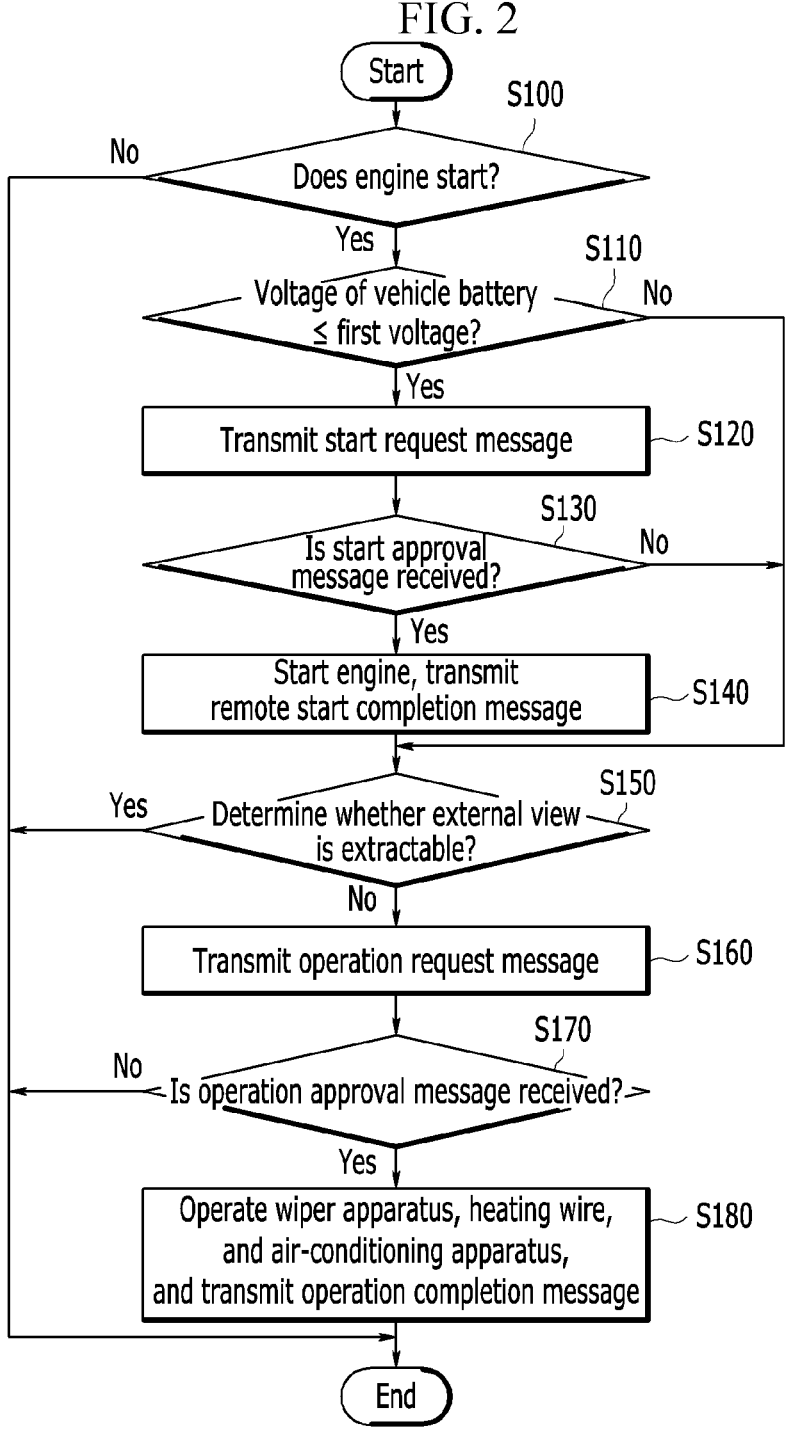

WIPER SYSTEM AND CONTROL METHOD THEREOF

CROSS-REFERENCE TO RELATED APPLICATION

This application claims priority to and the benefit of Korean Patent Application No. 10-2013-0120738 filed in the Korean Intellectual Property Office on Oct. 10, 2013, the entire contents of which are incorporated herein by reference.

TECHNICAL FIELD

The present disclosure relates to a wiper system and a control method thereof.

BACKGROUND

A windshield glass is mounted in a vehicle in order to secure a visible line of sight of a driver and protect the driver from foreign materials.

A black box system stores external images of the vehicle and provides a reference for clearly determining a cause of a traffic accident when a traffic accident occurs. Further, even in a case where external damage to the vehicle is generated, it is possible to clearly determine a cause of the external damage since a black box camera operates when the vehicle is parked.

However, in certain situations the black box camera may not be able to photograph the outside of the vehicle due to foreign materials on the windshield glass. Particularly, when the vehicle is parked outdoors in winter, the black box camera may not be able to photograph the outside of the vehicle if snow accumulates on the vehicle. Thus, when the vehicle is damaged the cause may not be precisely determined.

Further, when snow has accumulated on the windshield glass, time is spent in removing the accumulated snow. It becomes more difficult to remove the accumulated snow if the accumulated snow freezes into ice.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a wiper system and a control method thereof having advantages of enabling a camera to photograph the outside of a vehicle by removing foreign materials from a windshield glass when the vehicle is parked.

A wiper system according to an exemplary embodiment of the present disclosure may include a first camera provided inside a vehicle to photograph the outside of the vehicle beyond a windshield glass. A wiper apparatus removes foreign materials from the windshield glass; and a body control module operates the wiper apparatus. A telematics module communicates with a driver terminal and controls the body control module. The telematics module determines whether an external view is extractable from an image acquired by the first camera during an engine stop, and applies a wiper operation signal to the body control module based on a communication result according to a communication with the driver terminal if the external view is not extracted.

The telematics module may transmit an operation request message to the driver terminal if the external view is not extracted, and may apply the wiper operation signal to the body control module if an operation approval message is received from the driver terminal.

The system may further include a second camera provided at a rear side of the vehicle, wherein the operation request message includes at least one of the image acquired by the first camera, an image acquired by the second camera, and weather information of a region where the vehicle is located.

The telematics module may transmit a wiper operation completion message to the driver terminal if the wiper operation signal is applied to the body control module.

The system may further include: a battery sensor detecting a voltage of a vehicle battery, and a smart key module receiving a remote start signal from the telematics module and performing a remote start. The telematics module generates the remote start signal based on a communication result according to communication with the driver terminal if the voltage of the vehicle battery is less than or equal to a first voltage.

The telematics module may transmit a start request message to the driver terminal if the voltage of the vehicle battery is less than or equal to the first voltage, and may apply the remote start signal to the smart key module if a start approval message is received from the driver terminal.

The telematics module may transmit a remote start completion message to the driver terminal if the remote start signal is applied to the smart key module.

The telematics module may transmit a start off signal to the smart key module if an elapsed time after engine starting is greater than or equal to a predetermined time, or the voltage of the vehicle battery is greater than or equal to a second voltage.

The system may further include: a heating wire installed in the windshield glass, and an air-conditioning apparatus controlling an internal temperature of the vehicle. The body control module operates the heating wire and the air-conditioning apparatus according to the wiper operation signal.

A control method for a wiper system according to an exemplary embodiment of the present disclosure may include determining whether an engine is in a stop state. The method further includes determining whether an external view is extractable from an image acquired by a first camera during an engine stop and transmitting an operation request message to a driver terminal if the external view is not extracted. A wiper operation signal is applied to the body control module if an operation approval message is received from the driver terminal. The method may further include collecting an image acquired by a second camera provided at a rear side of a vehicle. The operation request message may include at least one of the image acquired by the first camera, the image acquired by the second camera, and weather information of a region where the vehicle is located.

The method may further include transmitting a wiper operation completion message to the driver terminal if the wiper operation signal is applied to the body control module.

The method may further include: comparing a voltage of a vehicle battery with a first voltage, and generating a remote start signal based on the communication result according to a communication with the driver terminal if the voltage of the vehicle battery is less than or equal to the first voltage.

The method may further include: transmitting a start request message to the driver terminal if the voltage of the vehicle battery is less than or equal to the first voltage, and applying the remote start signal to a smart key module if a start approval message is received from the driver terminal.

The method may further include transmitting a remote start completion message to the driver terminal if the remote start signal is applied to the smart key module.

The method may further include applying a start off signal to the smart key module if an elapsed time after engine starting is greater than or equal to a predetermined time.

The method may further include applying a start off signal to the smart key module if the voltage of the vehicle battery is greater than or equal to a second voltage.

BRIEF DESCRIPTION OF THE DRAWINGS

FIG. 2 is a flowchart illustrating a control method for a wiper system according to an exemplary embodiment of the present disclosure.

DETAILED DESCRIPTION

Figure 1:
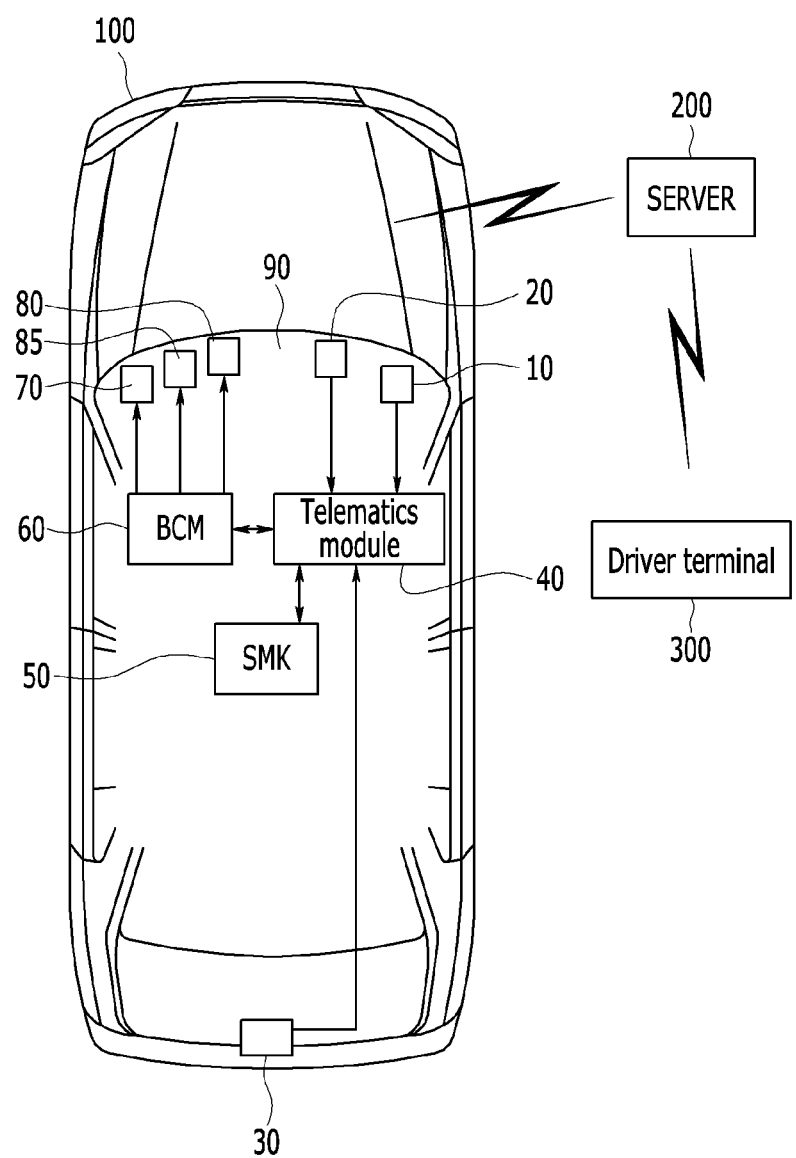
FIG. 1 is a block diagram schematically illustrating a wiper system according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

FIG. 1 is a block diagram illustrating a wiper system according to an exemplary embodiment of the present disclosure. As shown in FIG. 1, a wiper system includes a first camera 20 provided inside a vehicle 100 to photograph the outside of the vehicle beyond a windshield glass 90, a wiper apparatus 80 for removing foreign materials on the windshield glass 90, a body control module (BCM) 60 operating the wiper apparatus 90, and a telematics module 40.

The first camera 20 may be a black box camera used in a black box system that is installed in the vehicle 100.

The wiper apparatus 80 removes foreign materials (e.g., snow, frost, dirt, and the like) from the windshield glass 90 according to a control signal of the body control module 60, The telematics module 40 determines whether an external view is extractable from an image acquired by the first camera 20 in an engine stop state. That is, when there are foreign materials on the windshield glass 90, it is impossible to extract the external view of the vehicle, and therefore, the telematics module 40 applies a wiper operation signal to the body control module 40 if the external view is not extracted. In order to provide pedestrian information, neighboring vehicle/building information, lane information, and the like based on the image acquired by the first camera 20 to a driver, the external view of the vehicle should be extracted from the acquired image. In the process of determining whether the external view is extractable, it is possible to determine whether predetermined information (e.g., building information) is extractable from the acquired image. However, it should be understood that the scope of the present disclosure is not limited thereto. Other information may also be applicable according to the intention of a person of ordinary skill in the art, and accordingly the person of ordinary skill in the art may set an appropriate reference to determine whether the external view is extractable.

The body control module 60 operates the wiper apparatus 80 according to the wiper operation signal to remove foreign materials from the windshield glass 90.

The telematics module 40 is connected with a communication network to communicate with a driver terminal 300 through a server 200. The driver terminal 300 may be a wireless communication device such as a smart phone, a tablet PC, a personal digital assistant (PDA), and the like.

The telematics module 40 may transmit an operation request message for requesting operation of the wiper apparatus 80 to the driver terminal 300 if the external view is not extracted.

The driver can check the operation request message and determine whether to operate the wiper apparatus 80. The driver may transmit an operation approval message to the telematics module 40 through the driver terminal 300. The telematics module 40 applies the wiper operation signal to the body control module 60 if the operation approval message is received.

The wiper system according to an exemplary embodiment of the present disclosure may further include a second camera 30 provided at the rear side of the vehicle 100.

The second camera 30 may be a camera which is installed at the trunk lid of the vehicle 100 and used in a parking assistant system, but the present disclosure is not limited thereto. It is sufficient that the second camera 30 can provide a road state such as an accumulated snow state.

The operation request message may include the image acquired by the first camera 20, an image acquired by the second camera 30, weather information of a region where the vehicle 100 is located, and the like. In a case that only the first camera 20 is used, the telematics module 40 may incorrectly determine that the external view is not extracted if an obstacle is located in front of the vehicle. That is, the second camera 30 can more stably acquire an image about a road state compared to the first camera 20, and thus it is helpful in determination for operating the wiper apparatus 80. Further, the driver can determine whether snow accumulated on the windshield glass 90 may be frozen into ice based on the weather information of the region where the vehicle 100 is located. Accordingly, the snow accumulated on the windshield glass 90 may be removed before sticking.

The telematics module 40 may transmit a wiper operation completion message to the driver terminal 300 if the wiper operation signal is applied to the body control module 60. The driver can determine that the wiper apparatus 90 is normally operated to remove foreign materials based on the wiper operation completion message.

The wiper system according to an exemplary embodiment of the present disclosure may further include a battery sensor 10 detecting a voltage of a vehicle battery and a smart key module (SMK) 50 receiving a remote start signal from the telematics module 40 and performing a remote start.

The telematics module 40 may transmit a start request message to the driver terminal 300 if the voltage of the vehicle battery is less than or equal to a first voltage. The first voltage can be arbitrarily set by a person of ordinary skill in the art in consideration of the vehicle battery state of discharge.

The driver can check the start request message and determine whether to operate a remote start function. That is, the driver can check a state of the vehicle battery in the winter to prevent the vehicle battery from being discharged. The driver may transmit a start approval message to the telematics module 40 through the driver terminal 300. The telematics module 40 applies the remote start signal to the smart key module 50 if the start approval message is received.

The telematics module 40 may transmit a remote start completion message to the driver terminal 300 if the remote start signal is applied to the smart key module 50.

The telematics module 40 may apply a start off signal to the smart key module 50 if an elapsed time after engine starting is greater than or equal to a predetermined time, or if the voltage of the vehicle battery is greater than or equal to a second voltage. The predetermined time and the second voltage can be arbitrarily set by a person of ordinary skill in the art in consideration of charging of the vehicle battery.

The wiper system according to an exemplary embodiment of the present disclosure may further include a heating wire 85 installed in the windshield glass 90 and an air-conditioning apparatus 70 controlling an internal temperature of the vehicle 100. The body control module 60 may operate the heating wire 85 and the air-conditioning apparatus 70 according to the wiper operation signal. That is, the heating wire 85 and the air-conditioning apparatus 70 can support the removal of snow from the windshield glass 90.

The telematics module 40 may be implemented with one or more microprocessors executed by a predetermined program, and the predetermined program may include a series of commands for performing each step included in a control method for the wiper system according to an exemplary embodiment of the present disclosure to be described below.

Some processes in the control method for the wiper system according to an exemplary embodiment of the present disclosure to be described below may be executed by the telematics module 40, some other processes may be executed by the body control module 60, and some other processes may be executed by the smart key module 50.

Although the telematics module 40, the body control module 60, and the smart key module 50 are separated according to their operating functions in this embodiment, the present disclosure is not limited thereto. For example, one controller may be provided to control all of the constituent elements.

FIG. 2 is a flowchart illustrating a control method for a wiper system according to an exemplary embodiment of the present disclosure. As shown in FIG. 2, a control method for the wiper system begins in a state where an engine stops at step S100. The telematics module 40 compares the voltage of the vehicle battery with the first voltage at step S110. At step S110, the telematics module 40 transmits the start request message to the driver terminal 300 if the voltage of the vehicle battery is less than or equal to the first voltage at step S120.

The telematics module 40 applies the remote start signal to the smart key module 50 if the start approval message is received from the driver terminal 300 at step S130. The smart key module 50 performs remote start, and the telematics module 40 transmits the remote start completion message to the driver terminal 300 at step S140.

The telematics module 40 may apply the start off signal to the smart key module 50 if the elapsed time after engine starting is greater than or equal to the predetermined time, or if the voltage of the vehicle battery is greater than or equal to the second voltage.

In addition, the telematics module 40 determines whether the external view is extractable based on the image acquired by the first camera 20 at step S150.

Steps S110 and S150 may be simultaneously performed, or may be separately performed regardless of the sequence.

At step S150, if the external view is not extracted, the telematics module 40 transmits the operation request message to the driver terminal 300 at step S160. At this time, the telematics module 40 may collect the image acquired by the second camera 30, and may transmit at least one of the image acquired by the first camera 20, the image acquired by the second camera 30, and weather information of a region where the vehicle is located.

If the operation approval message is received from the driver terminal 300 at step S170, the telematics module 40 applies the wiper operation signal to the body control module 60 at step S180. The body control module 60 operates the wiper apparatus 80 according to the wiper operation signal. At this time, the body control module 60 operates the heating wire 85 or the air-conditioning apparatus 70 to support removing snow from the windshield glass 90. The telematics module 40 transmits the wiper operation completion message to the driver terminal 300 if the wiper operation signal is applied to the body control module 60.

Therefore, according to an exemplary embodiment of the present disclosure, it is possible to photograph the outside of the vehicle by removing foreign materials on the windshield glass while the vehicle is in a parked state.

In addition, it is possible to prevent the vehicle battery from being discharged by performing the remote start if the low voltage state of the vehicle battery is detected in the winter.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A wiper system comprising:
   a first camera provided inside a vehicle to photograph outside of the vehicle beyond a windshield glass;
   a wiper apparatus removing foreign materials from the windshield glass
   a body control module operating the wiper apparatus;
   a telematics module communicating with a driver terminal and controlling the body control module,
   wherein the telematics module determines whether an external view is extractable from an image acquired by the first camera during an engine stop, and applies a wiper operation signal to the body control module based on a communication result according to communication with the driver terminal if the external view is not extracted, and
   wherein the telematics module transmits an operation request message to the driver terminal if the external view is not extracted, and applies the wiper operation signal to the body control module if an operation approval message is received from the driver terminal; and
   a second camera provided at a rear side of the vehicle,
   wherein the operation request message comprises at least one of the image acquired by the first camera, an image acquired by the second camera, and weather information of a region where the vehicle is located.

2. The system of claim 1, wherein the telematics module transmits a wiper operation completion message to the driver terminal if the wiper operation signal is applied to the body control module.

3. The system of claim 1, further comprising:
   a battery sensor detecting a voltage of a vehicle battery; and
   a smart key module receiving a remote start signal from the telematics module and performing a remote start,
   wherein the telematics module generates the remote start signal based on a communication result according to the communication with the driver terminal if the voltage of the vehicle battery is less than or equal to a first voltage.

4. The system of claim 3, wherein the telematics module transmits a start request message to the driver terminal if the voltage of the vehicle battery is less than or equal to the first voltage, and applies the remote start signal to the smart key module if a start approval message is received from the driver terminal.

5. The system of claim 4, wherein the telematics module transmits a remote start completion message to the driver terminal if the remote start signal is applied to the smart key module.

6. The system of claim 3, wherein the telematics module applies a start off signal to the smart key module if an elapsed time after engine starting is greater than or equal to a predetermined time, or the voltage of the vehicle battery is greater than or equal to a second voltage.

7. The system of claim 1, further comprising:
a heating wire installed in the windshield glass; and
an air-conditioning apparatus controlling an internal temperature of the vehicle,
wherein the body control module operates the heating wire and the air-conditioning apparatus according to the wiper operation signal.

8. A control method for a wiper system comprising:
determining whether an engine is in a stop state;
determining whether an external view is extractable from an image acquired by a first camera during an engine stop;
transmitting an operation request message to a driver terminal if the external view is not extracted;
applying a wiper operation signal to the body control module if an operation approval message is received from the driver terminal; and
collecting an image acquired by a second camera provided at a rear side of a vehicle,
wherein the operation request message comprises at least one of the image acquired by the first camera, the image acquired by the second camera, and weather information of a region where the vehicle is located.

9. The method of claim 8, further comprising transmitting a wiper operation completion message to the driver terminal if the wiper operation signal is applied to the body control module.

10. The method of claim 8, further comprising:
comparing a voltage of a vehicle battery with a first voltage; and
generating a remote start signal based on a communication result according to a communication with the driver terminal if the voltage of the vehicle battery is less than or equal to the first voltage.

11. The method of claim 10, further comprising:
transmitting a start request message to the driver terminal if the voltage of the vehicle battery is less than or equal to the first voltage; and
applying the remote start signal to a smart key module if a start approval message is received from the driver terminal.

12. The method of claim 11, further comprising transmitting a remote start completion message to the driver terminal if the remote start signal is applied to the smart key module.

13. The method of claim 10, further comprising applying a start off signal to the smart key module if an elapsed time after engine starting is greater than or equal to a predetermined time.

14. The method of claim 10, further comprising applying a start off signal to the smart key module if the voltage of the vehicle battery is greater than or equal to a second voltage.

* * * * *